US012502803B2

(12) United States Patent
Eastland

(10) Patent No.: US 12,502,803 B2
(45) Date of Patent: Dec. 23, 2025

(54) MODULAR AXE

(71) Applicant: Daniel E. Eastland, Greenville, SC (US)

(72) Inventor: Daniel E. Eastland, Greenville, SC (US)

( * ) Notice: Subject to any disclaimer, the term of this patent is extended or adjusted under 35 U.S.C. 154(b) by 146 days.

(21) Appl. No.: 18/406,115

(22) Filed: Jan. 6, 2024

(65) Prior Publication Data

US 2024/0239005 A1 Jul. 18, 2024

Related U.S. Application Data

(60) Provisional application No. 63/439,223, filed on Jan. 16, 2023.

(51) Int. Cl.
*B27L 7/06* (2006.01)
*B25G 3/20* (2006.01)

(52) U.S. Cl.
CPC . *B27L 7/06* (2013.01); *B25G 3/20* (2013.01)

(58) Field of Classification Search
CPC ... B27L 7/06; B25F 1/006; B25F 1/02; B25G 3/20
See application file for complete search history.

(56) References Cited

U.S. PATENT DOCUMENTS 4,114,216 A * 9/1978 Gatby .................... B26B 23/00 81/177.2
4,183,385 A * 1/1980 Burkybile ................ B25F 1/02 30/308.3
4,287,623 A * 9/1981 Tarran .................... B26B 23/00 7/166
5,185,992 A * 2/1993 Garcia .................... B25G 3/16 403/361
8,220,852 B2 7/2012 Fenstemaker
8,387,188 B2 3/2013 Murphy
8,746,767 B2 6/2014 Mouch et al.
10,376,978 B2 * 8/2019 Estevo .................... B25G 3/12
10,994,400 B2 * 5/2021 Bar ........................ A01B 1/022
12,285,853 B2 * 4/2025 Langan .................. B25F 1/006
2005/0271466 A1 12/2005 Perez et al.
2006/0230885 A1 * 10/2006 Olson .................... B25B 23/16 81/177.85
2007/0098487 A1 5/2007 Kim
2012/0036668 A1 * 2/2012 Farland .................. B25F 1/006 15/245.1

(Continued)

*Primary Examiner* — Omar Flores Sanchez
(74) *Attorney, Agent, or Firm* — Kim and Lahey Law Firm, LLC; Douglas W. Kim

(57) ABSTRACT

A modular axe having a handle; securing clamp and opening adapted to receive the handle; a first portion removable attached to the securing clamp; a second portion removable attached to the securing clamp. The front portion can be a blade and the rear portion can be a separate tool wherein the front portion and the second portion are different hardnesses and components. The handle can be received in an opening and the opening can include an oval cross section. A fastener can be removable attached to the securing clamp and can extend into or through the first side, the front portion, and the second side. A slot can be defined in the handle and adapted to receive a tab defined in the front portion wherein slot and the tab can be operatively associated to prevent the front and rear portion and securing clamp from sliding lengthwise along the handle.

17 Claims, 4 Drawing Sheets

(56) References Cited

U.S. PATENT DOCUMENTS

| | | | | |
|---|---|---|---|---|
| 2013/0045099 | A1* | 2/2013 | Bicknell | B63H 16/04 416/70 R |
| 2013/0276240 | A1* | 10/2013 | Gresham | B25F 1/02 7/138 |
| 2017/0057074 | A1 | 3/2017 | D'Avignon et al. | |
| 2020/0361072 | A1 | 11/2020 | Langan | |
| 2021/0023630 | A1* | 1/2021 | Davis | B23B 51/12 |
| 2021/0260744 | A1* | 8/2021 | Noble | B25F 1/02 |
| 2021/0347028 | A1* | 11/2021 | Zanoni | B25F 1/02 |
| 2023/0249329 | A1* | 8/2023 | Chapman | B25F 1/02 7/167 |
| 2024/0123644 | A1* | 4/2024 | Caswell | B26B 23/00 |

* cited by examiner

MODULAR AXE

RELATED APPLICATIONS

This application claims priority from U.S. Provisional Patent Application Ser. 63/439,223 filed Jan. 16, 2023 incorporated by reference.

BACKGROUND OF THE INVENTION

1) Field of the Invention

This invention is directed to a modulated axe with interchangeable components to facilitate the easy configuration of different tools in a handle having varying hardness and utility. The modular configuration allows for use of varying attachments including having different dimensions, uses, physical properties, and metallurgy properties.

2) Description of the Related Art

Typically, axes are designed to cut, chop, and split wood. Using an axe against metal, rock, ice, antler, or other materials harder than wood can result in damage to the axe and pose a danger to the user. This danger may be realized immediately or at a later time if the integrity of the axe is compromised. Similar results are had if the axe is struck with another object, i.e. used as a wedge. Further, such improper use can quickly dull the axe, crack or chip the axe blade or poll, warp the eye, or compromise the handle.

Further, using the poll (blunt end portion of the axe or butt) as a hammer to hit metal tools (e.g., wedges) can create a mushroom effect that deforms the axe head, loosens the handle from the head, and ultimately result in the head coming free from the handle. Because axes are designed for cutting material such as wood and have an edge, they typically have a hardness less than that of a hammer so that forming, forging, and sharpening are easier. The harder a metal, the harder to sharpen so that axes tend to be of a softer metal than hammers.

Therefore, it would be desirable to have the poll of an axe made from a harder substance that that of the blade.

When cutting and splitting wood, the use of a wedge can have benefits. A wedge is generally a triangular shaped tool that is driven into wood or other material with a hammer such as a sledgehammer. Hammers can be of a harder material since these do not require an edge or sharpening. Many users are tempted to use an axe either as a wedge driving it in with a hammer, or as a hammer to drive in a wedge. Both uses damage the head or a normal axe.

When manufacturing an axe head, the metal is generally uniform from the bit (edge) to the poll end so that having different hardnesses and physical properties from the bit to the poll is difficult as the manufacturing process requires a single metal (e.g., hardness) throughout. While different metals can be used to have a harder edge such as harder steel forged welded to a softer head, changing the ends of the axe head are not generally possible. While difference heating and cooling can result in difference hardness, this process is complicated, inconsistent and expensive and does not allow for the interchangeability of components in an axe.

It would be advantageous to have an axe that can have a certain metal for the bit allowing for ease in sharpening and maintenance at the blade while having another metal for the poll end with different properties to provide different functions such as a hammer, pick, or the like and with a higher hardness.

It would be advantageous to have an axe that can have one end having one function such as a bit and the other end having another function such as a hammer, pick, claw, and the like.

It would be advantageous to have an axe system where the bit, the poll, or both may be readily changed to modify and increase the functionality of the axe.

BRIEF SUMMARY OF THE INVENTION

The above objectives are accomplished by providing a modular axe comprising: a handle; a front portion; a rear portion; and a securing clamp for receiving the handle and securing the front portion and the rear portion to the handle. In another embodiment the handle includes a slot defined in the handle and the front portion has a tab adapted to be received into the slot. Together, these features assisting in aligning the handle and front portion and securing the front portion to the hand.

The securing clamp may be made of one or more pieces secured together using removable fasteners. The front portion can be made from a material that is softer or harder than the material of the rear portion. The rear portion could be any number of tools such as a pick, a hammer, a second bit, a claw, and the like. The rear portion can be a spacer so that there is effectively no tool at the rear of the modular axe. The front or rear portion can include a spacer disposed between the portions of the securing clamp. Recesses can be defined in the handle for receiving the securing clamp.

The modular axe can include a handle; a securing clamp removable attached to the handle; a front portion removable attached to the securing clamp to secure the front portion to the handle; a blade included in the front portion; a rear portion removable attached to the securing clamp to secure the front portion to the handle wherein the front portion has a hardness less than that of the rear portion.

A slot can be defined in the handle and adapted to receive a tab defined in the front portion when the front portion is secured to the handle by the securing clamp. The front portion can have a hardness less than the rear portion and the front portion can have a hardness in the range of 49 to 55 using the Rockwell Hardness guide. A recess can be defined in the handle for receiving the securing clamp. The rear portion can be a hammer and the securing clamp can define a securing clamp opening for receiving the handle.

One or more slots can be defined in the handle can be adapted to receive the tab included in the front portion or the rear portion or both can be operatively associated to prevent the front portion, rear portion and securing clamp from sliding lengthwise along the handle. A first set of fasteners can be for securing the front portion to the securing clamp and a second set of fasteners for securing the second portion to the securing clamp. The first set of fasteners can include more fasteners than the second set of fasteners. The set of fasteners can include a first fastener that extends through the securing clamp and the first portion without penetrating the handle.

The first side of the securing clamp, the front portion, the second side and the rear portion can define the opening. A fastener can be removable attached to the securing clamp and extending through the first side and the front portion.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

Figure 1:
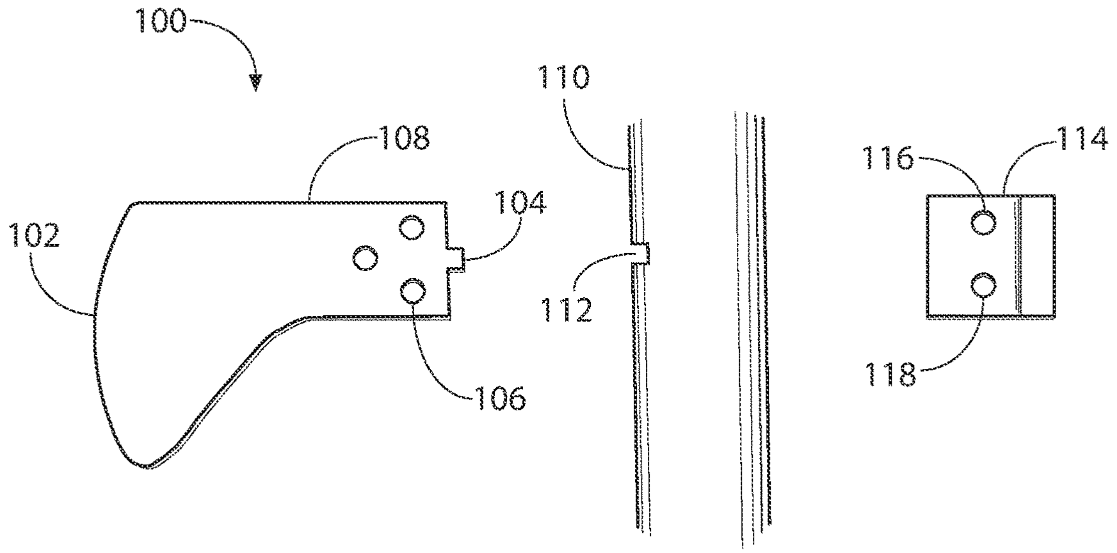
FIG. 1 is a side view of a front portion tool head, a portion of a handle, and a rear portion tool head.

With reference to the drawings, the invention will now be described in more detail. Referring to FIG. 1, a front portion 100 is shown that can include a bit 102, tab 104 and one or more openings 106. The front portion can be made of one or more metals that have a first hardness. The front portion can be single metal, or two or more metals joined such as with forge welding. The shape of the front portion can be of any design, but preferably an axe head shaped tool. The front portion can have a front portion fastening area 108 adapted to be received in a securing clamp (described below). A handle 110 is shown having a slot 112. The handle may further include a shoulder, back, belly, throat, knob, haft, end knob, and any combination. The slot can be adapted to receive the tab 104 of the front portion 100. The handle can have an oval cross section. The handle can be made from material such as metal, wood, plastic, fiberglass, or any combination.

A rear portion 114 can be included having a rear portion fastening area 116 adapted to be received in the securing clamp. The rear portion can include one or more openings 118.

Figure 2:
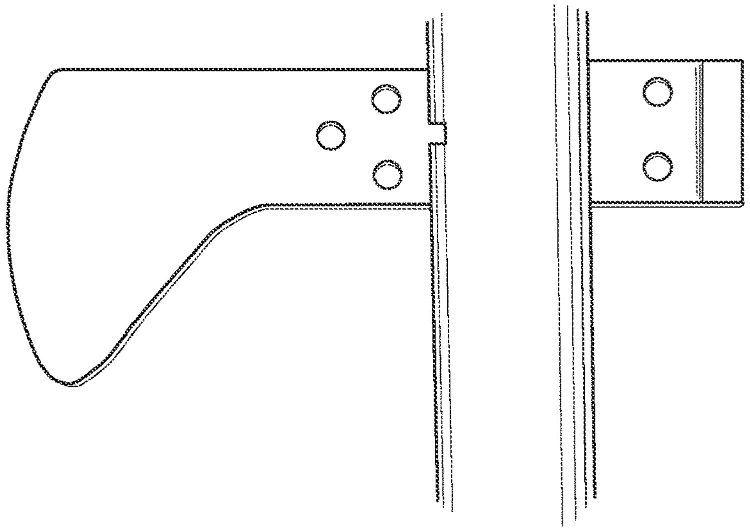
FIG. 2 is a side view of components of the modular axe.

Referring to FIG. 2, the front portion 100, rear portion 114, and the handle 110 are shown adjacent to each other in a configuration to receive the securing clamp.

Figure 3:
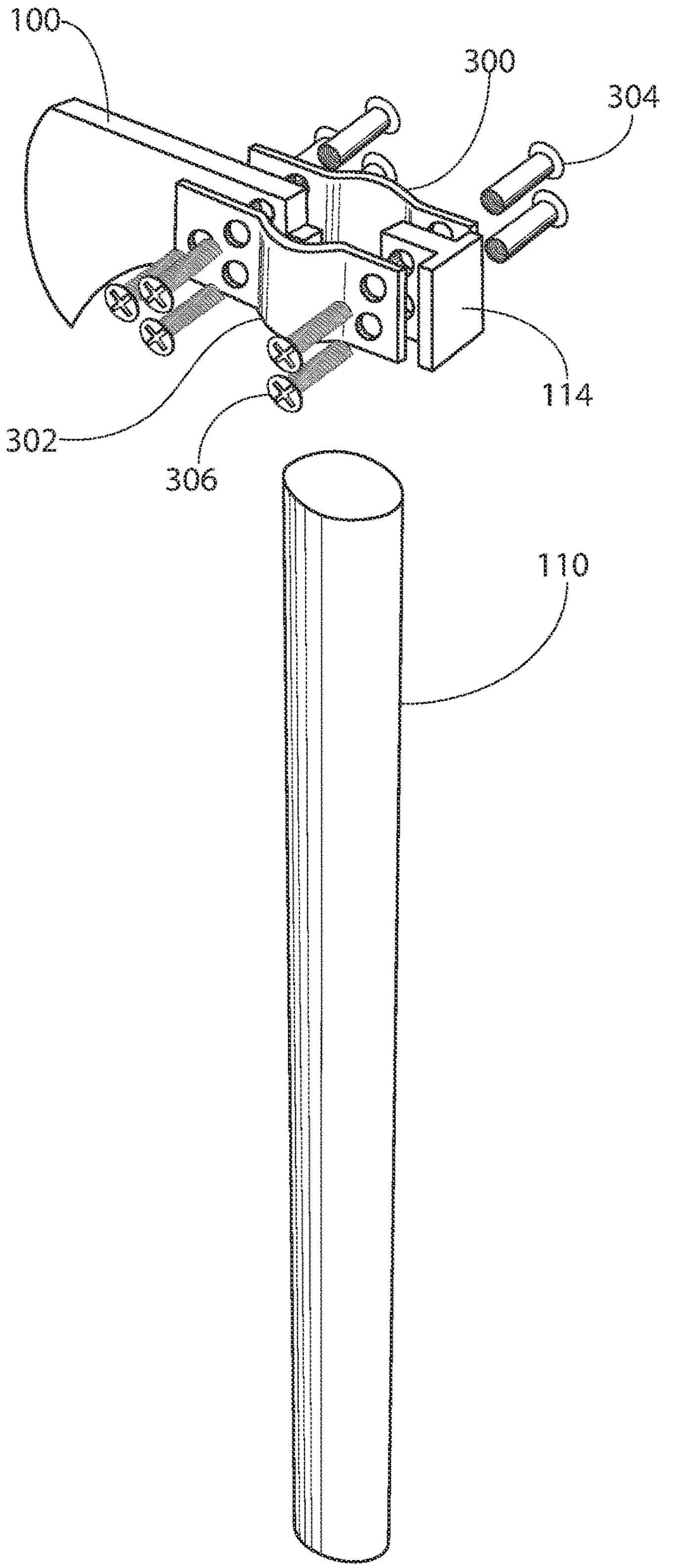
FIG. 3 is an exploded perspective view of an embodiment of the modular axe.

Referring to FIG. 3, an embodiment of the invention is shown in exploded, perspective view. The securing clamp is shown in a first portion 300 and second portion 302 separated and adjacent to front portion 100 and rear portion 114. While the securing clamp is shown in two portions, alternative embodiments could use a clamp of a single piece. The securing clamp, when assembled, may define an eye for receiving the handle. The securing clamp is adapted to securing the front portion and the rear portion to the handle 110 using fasteners 306. The fasteners 306 can be removably attached allowing the front portion and the rear portion to be removed and replaced. While fasteners 306 are shown in an embodiment with cap nuts 304, other types of fasteners are possible as noted elsewhere.

Figure 4:
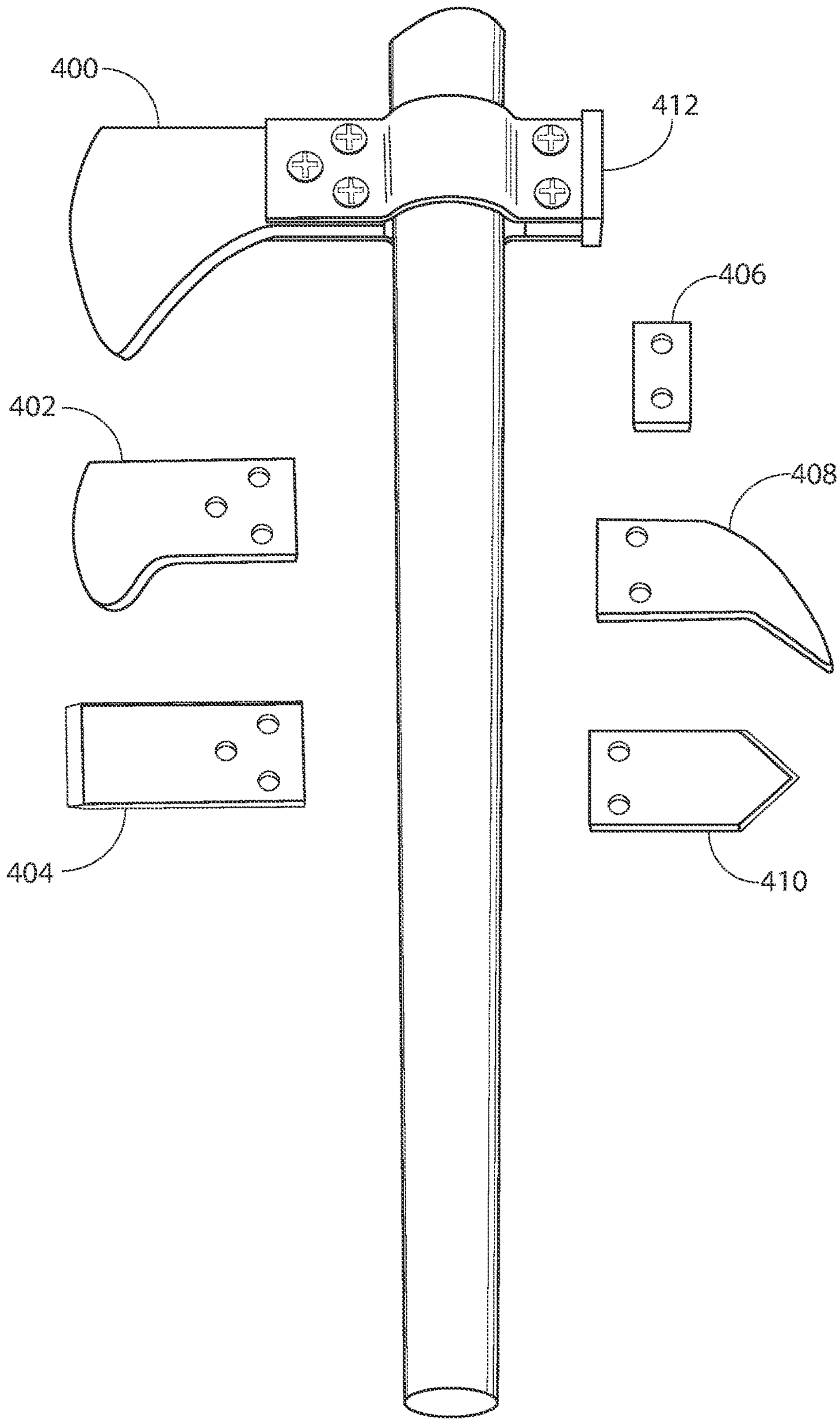
FIG. 4 is a side view of components of the modular axe.

Referring to FIG. 4, various interchangeable front portions and rear portions are shown. The front portion can be a larger bit portion 400, smaller bit portion 402, flat edge cutting tool 404 and other front portion tools. The front portion can include features toe, bit, heel, beard, cheek, and any combination. The rear portion can be a hammer tool 406, pick 408 and pointed cutting edge 410. One hammer type tool can include a flat portion 412 that can be perpendicular to the handle and parallel to the bit to provide more surface area for a hitting surface. Other tools may be included in the front portion or rear portion as one versed in the art will readily grasp. A spacer may be used in lieu of a front portion or rear portion.

Figure 5:
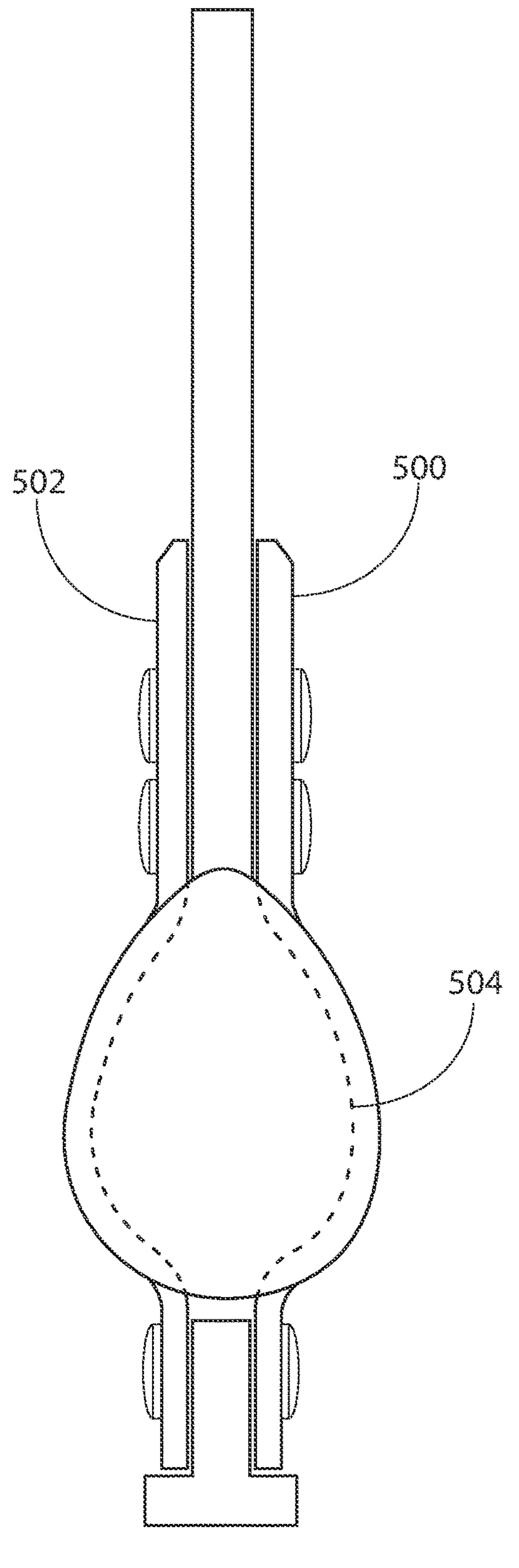
FIG. 5 is a top view of components of the modular axe.

Referring to FIG. 5, the securing clamp can have a first portion 500 and a second portion 502 that sandwich the handle, front portion, and the rear portion. Fasteners 302 can extend through the securing clamp to secure the components together. In one embodiment, the handle can include a recess 504 on each side to receive the securing clamp portions so that they are flush with the side of the handle. The handle can have a cross section area above the securing clamp that is less than the cross-section area at the securing clamp. The fasteners can be removable, such as with bolts, nuts, screws, rivets, and the like. In one embodiment a spacer can be used between the front portion and the securing clamp in the event that the space between the securing clamps should be filled to secure the front portion. In one embodiment a spacer can be used between the rear portion and the securing clamp in the event that the space between the securing clamps should be filled to secure the rear portion.

One advantage that can be realized by this assembly is that a pin or other securing member need not be received into the handle. This protects the integrity of the handle increasing its useful life. Further, the front portion can be interchanged with other components without the need to change the rear portion. The rear portion can be interchanged with other components without the need to change the front portion.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A modular axe comprising:

a handle;

a securing clamp removable attached to the handle;

a front portion removable attached to the securing clamp to secure the front portion to the handle;

a blade included in the front portion;

a rear portion removable attached to the securing clamp to secure the rear portion to the handle wherein the front portion has a hardness less than that of the rear portion.

2. The modular axe of claim 1 including a slot defined in the handle and adapted to receive a tab defined in the front portion when the front portion is secured to the handle by the securing clamp.

3. The modular axe of claim 1 wherein the front portion has a hardness in the range of 49 to 55 using the Rockwell Hardness guide.

4. The modular axe of claim 1 including a recess defined in the handle for receiving the securing clamp.

5. The modular axe of claim 1 wherein the rear portion includes a hammer.

6. The modular axe of claim 1 wherein the securing clamp defines a securing clamp opening for receiving the handle.

7. A modular axe comprising:

a handle;

a front portion carried by the handle;

a rear portion caried by the handle;

a securing clamp for receiving the handle and for removable securing the front portion and the rear portion to the handle;

wherein the front portion, the rear portion and the securing clamp defines an opening for receiving the handle; and, a slot defined in the handle adapted to receive a tab included in the front portion wherein the slot, tab and securing clamp are operatively associated to prevent the front portion, rear portion and securing clamp from sliding lengthwise along the handle.

8. The modular axe of claim 7 wherein the opening includes an oval cross section.

9. The modular axe of claim 7 including a first set of fasteners for securing the front portion to the securing clamp and a second set of fasteners for securing the second portion to the securing clamp.

10. The modular axe of claim 9 wherein the first set of fasteners includes more fasteners than the second set of fasteners.

11. The modular axe of claim 7 including a set of fasteners for securing the front portion to the securing clamp.

12. The modular axe of claim 11 wherein the set of fasteners include a first fastener that extends through the securing clamp and the first portion without penetrating the handle.

13. A modular axe comprising:

a handle;

a securing clamp having a first side, a second side and an opening adapted to receive the handle;

a first portion removable attached to the securing clamp;

a second portion removable attached to the securing clamp;

a slot defined in the handle and adapted to receive a tab defined in the front portion.

14. The modular axe of claim 13 wherein the first side, the front portion, the second side and the rear portion define the opening.

15. The modular axe of claim 13 wherein the opening includes an oval cross section.

16. The modular axe of claim 13 including a fastener removable attached to the securing clamp and extending through the first side and the front portion.

17. The modular axe of claim 13 wherein the slot and the tab are operatively associated to prevent the front portion, rear portion and securing clamp from sliding lengthwise along the handle.

* * * * *